June 19, 1951     J. H. DE FREES     2,557,177
VALVE STRUCTURE

Filed Aug. 30, 1946     2 Sheets—Sheet 1

INVENTOR
JOSEPH H. DeFREES
BY
ATTORNEYS

June 19, 1951     J. H. DE FREES     2,557,177
VALVE STRUCTURE

Filed Aug. 30, 1946     2 Sheets-Sheet 2

INVENTOR
JOSEPH H. DeFREES
BY *Hyde, Meyer, Baldwin & Loran*
ATTORNEYS

Patented June 19, 1951

2,557,177

UNITED STATES PATENT OFFICE 2,557,177

VALVE STRUCTURE

Joseph H. De Frees, Warren, Pa.

Application August 30, 1946, Serial No. 693,945

1 Claim. (Cl. 251—125)

The invention relates to novel and improved manifold and cross valve structures, and is, in certain structural respects, an improvement on the devices shown, described, and claimed in my copending application, Serial No. 663,065, filed April 18, 1946, now Patent Number 2,458,413, granted November 9, 1948. Said copending application disclosed a cross valve header structure of improved design and considerably lighter weight than heretofore available.

An object of the present invention is to provide further novel and improved features of manifold and valve construction and design which materially contribute to weight reduction, improvement in liquid flow, ease of installation, complete drainage, elimination of joints between valves, and reduction in cost.

In the drawings accompanying the present application:

It will be apparent to those skilled in the art upon a study of the drawings and the following description, that the novel and improved structure now to be described is adaptable to the installation of one or other of a variety of valve types. The structure has been particularly developed to solve problems in the installation of cross valves in a manifold or header beneath a multi-compartment tank for gasoline or oil transportation, and the embodiments hereinafter described are illustrated in this connection.

Figure 1:
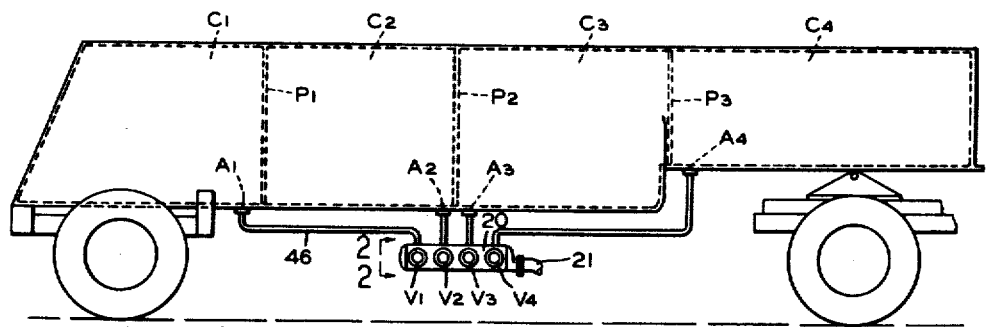
Fig. 1 is a view in side elevation showing a liquid transportation tank equipped with a manifold and valve structure embodying the present invention.

Referring briefly to Fig. 1 there is shown a conventional tank truck provided with a series of compartments separated by bulkheads. Each such compartment is normally provided with a bottom outlet controlled by a so-called cross valve. The plurality of cross valves thus required, have, in the past, been formed integrally usually from heavy metal such as cast iron having a port communicating with the tank compartment and incorporating the valve seat, and having two opposed lateral ports for communication with similar adjoining and cooperating ports on other valve bodies disposed in tandem therewith.

Such lateral ports were provided with connecting flanges for attachment to the complementary flanges of the aforesaid respectively adjoining valve bodies. The series of valve bodies thus connected in tandem with intermediate sealing gaskets provided a continuous passage constituting the manifold heretofore referred to.

Such an arrangement was cumbersome, the individual valves were expensive and little or no flexibility was permitted in the assembly and relative position of the valves. It was difficult or impossible to thus build up a header or manifold without leaving low spots adjacent the valve controls or connecting flanges, and such low spots would not drain by gravity, but left trapped pools of liquid which might be highly volatile and inflammable. In addition, such pools might contaminate liquid later discharged from another compartment, thus perhaps increasing the explosion or fire hazard. All these and other disadvantages of the prior construction are avoided by means of the present invention.

Fig. 1 shows a series of tank compartments $C_1$, $C_2$, etc., separated by partitions $P_1$, $P_2$, etc. At the bottom of each compartment is an outlet aperture $A_1$, $A_2$, etc., in controllable communication, as will appear, with a common manifold 20 and discharge pipe 21. Said communication is controlled by individual valve structure $V_1$, $V_2$, etc., carried on manifold 20. The valves are shown as arranged horizontally in a longitudinal series along the manifold, and it will be apparent from a glance at the drawings that any one or more valves may be operated to permit individual discharge from any one selected compartment, or simultaneous discharge from more than one. Other arrangements than the one actually here shown are quite feasible, and those skilled in the art will have no difficulty in rearranging the piping and valves in such way, for example, as will permit pumping liquid from one compartment to another or other such expedient.

The manifold or header 20 is preferably formed from seamless steel tubing of convenient diameter to accommodate the anticipated liquid flow, and has end walls 22 and 23, either one or both of which may have liquid intake or discharge ports, one such port being located in wall 23, and being in communication with discharge pipe 21.

Figure 3:
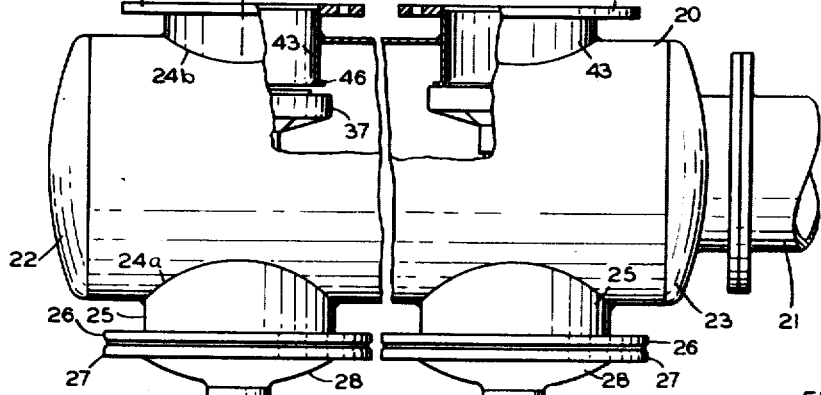
Fig. 3 is a top plan view, parts being broken away and in section, and greatly enlarged, taken approximately on the line 3—3 of Fig. 2.

The cross valve disposition and supporting structure will now be described. The cylindrical wall of header 20 is provided with one or more pairs of aligned apertures 24a and 24b respectively, adapted to receive and retain cooperating valve parts. A header of the character here shown may carry any desired plurality of cross valves, two being shown in Fig. 3, but since the construction and installation of each is identical, only one will be described, with particular reference to Figs. 1 to 4.

Aperture 24a is of suitable size and shape to receive, in closely fitted relationship, a tube member 25 which extends partly within and partly without the header 20, and which is fixed in place, preferably by welding, as shown. The outer portion of tube 25 is provided with an outturned flange 26 adapted to be complementary to a cooperating flange 27 on a closure cap 28. Flanges 26 and 27 may be bolted or otherwise suitably removably secured to each other in any convenient way, and an annular sealing gasket 29 is here shown as interposed between them.

Cap 28 is centrally apertured to receive a valve stem guide 30 to which the cap may be united by welding, or otherwise. The guide 30 is centrally bored and threaded to carry a similarly threaded valve stem 33. The mounting, packing and manipulation of the valve stem are conventional, and the valve stem is advanceable and retractable by rotation, in familiar fashion.

The inner end of the valve stem is flanged or headed at 34, and removably attached to such head is a hub nut 35 and a threaded reduced extension 36. Carried on such extension are a backing washer 37 and a retaining washer 38 which grip between them an annular yieldable sealing member 39. The washers are fixedly retained by a nut 40 on the threaded extension 36.

Aperture 24b in the wall of header 20 is diametrically opposed to aperture 24a, and is of suitable size and shape to receive, in closely fitted relationship, a tube member 43 which extends partly within and partly without header 20, and is fixed in place, preferably by welding, at 44. The outer portion of tube 43 carries a flange 45 adapted for establishing a connection with a liquid flow conduit from a tank compartment. The inner end of tube 43 constitutes an annular valve seat, and for this purpose it may be outwardly deformed to provide a shoulder 46 upon which the yieldable valve head member 39 is seatable.

In one manner of operating the cross valve manifold above described the flanges 45 on the valve seat tubes 43 are connected to mated flanges on respective outlets 46 which lead from the tank compartments $C_1$, $C_2$, etc. The delivery outlet from the manifold 20 is in communication with pipe 21. Manipulation of the several valves permits fluid from selected compartments to flow to said discharge pipe.

In the embodiment above described the tube members 25 and 43 are in axial alignment, their common axis being in a horizontal plane beneath the tank. While other arrangements are feasible, the one shown and described is preferred since the valve manipulating controls are more conveniently accessible, and when the valve stem lies in a horizontal plane there is no interference with free drainage within the header or manifold 20. This arrangement prevents the retention of trapped pools of explosive or inflammable liquid within the header.

The structure shown and described can be constructed at a fraction of the cost of the cumbersome cross valve assemblies heretofore available. A large proportion of structural elements are formed from standard metal sheets or tubes which are readily available and reasonable in cost. A manifold such as herein described may be made up to any suitable length, so as to accommodate any required number of valves. The assembly is considerably lighter in weight than an aggregation of heavy individual cross valves such as have been heretofore used. As already noted, in prior construction the tandem series of valve bodies constituted the header or manifold, said bodies being of heavy cast metal construction, and being provided with cumbersome interconnecting flanges. Such prior art structure was extremely conducive to the entrapment of pools of liquid within the header.

A somewhat modified form of valve and seat construction is shown in Figs. 5 to 8 inclusive, such construction being readily adaptable to the manifold already described, and being devised to serve as a check valve, as will appear. In the embodiment now to be discussed, the manifold 20a and the tube members 25a and 43a are respectively similar to, or identical with, the corresponding members 20, 25 and 43 of Figs. 1 to 4. In the present embodiment, however, the valve head 60 is not carried by the valve stem 33a, but is hingedly attached to the valve seat tube 43a in the following manner.

A segmental strap 61 is welded or otherwise attached to tube 43a, and has at its opposed ends a pair of projecting lugs 62. Surrounding a major portion of the valve head is a spring clip 63 having free ends 64 pivotally seated in apertures in lugs 62. It will be apparent from a glance at the several operating positions of the valve head, as shown respectively in Figs. 6 and 8, that when valve stem 33a is retracted (Fig. 8), fluid pressure on the face 65 of the valve head causes it to open to any extent permitted by the valve stem position. From Figs. 6 and 8 it will be apparent that the pivot axis is set somewhat out of the plane of the valve seat, such construction assuring a more positive closing action than if the seat and pivot were in the same plane.

The structure just described differs substantially from that used in the prior art since in the present instance all elements including the complete hinge and pivotal supports are entirely within the manifold, and therefore do not give rise to leakage spots so often found in prior hinged valve head structures. In such prior structures the opposed ends of the hinge pin usually were seated in apertures extending into or through the valve housing walls. In addition, in the present structure, the valve head can be rapidly and easily removed, when desired, by compressing the leg portions 66 (Fig. 7) of the spring clip 63 until the free ends 64 are withdrawable inwardly from the apertures in lugs 62.

Figure 4:
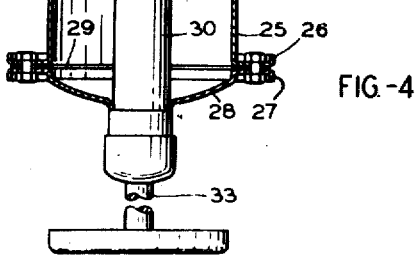
Fig. 4 is a sectional view taken on the line 4—4 of Fig. 3.
Figure 2:
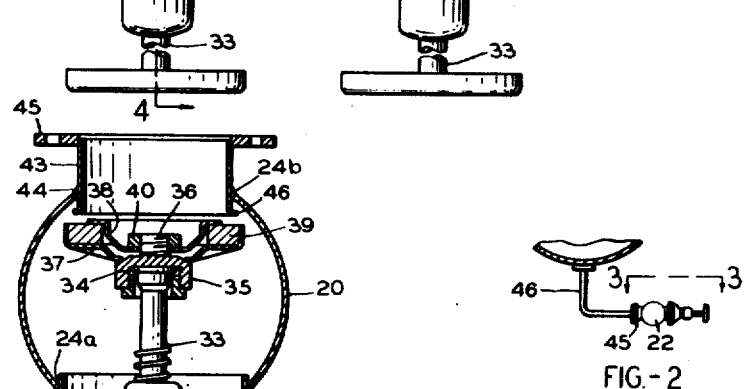
Fig. 2 is an end elevational view taken approximately on the line 2—2 of Fig. 1.
Figure 5:
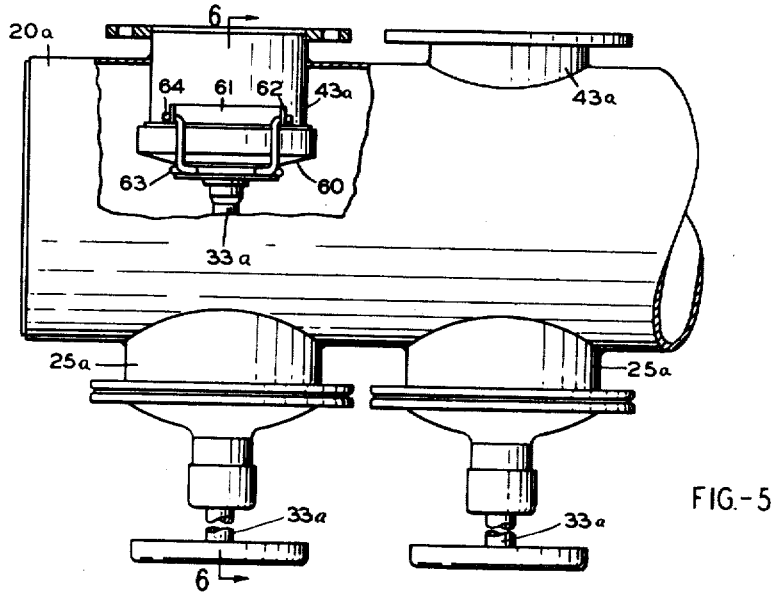
Fig. 5 is a view similar to Fig. 3 but showing a somewhat modified form of valve head and valve seat structure.

The pivoted mounting in Figs. 5 to 8 inclusive also provides a check valve which prevents back flow of liquid into an empty or partially filled compartment. This undesired result might arise from the negligence or even dishonesty of an operator. Assume that a first compartment, equipped with a valve such as shown in Fig. 4, has been fully discharged, but after such discharge the operator does not close the valve. If the operator now opens a second compartment to discharge, the liquid in the manifold rises, by hydrostatic pressure, into the first compartment.

Figures 6, 8:
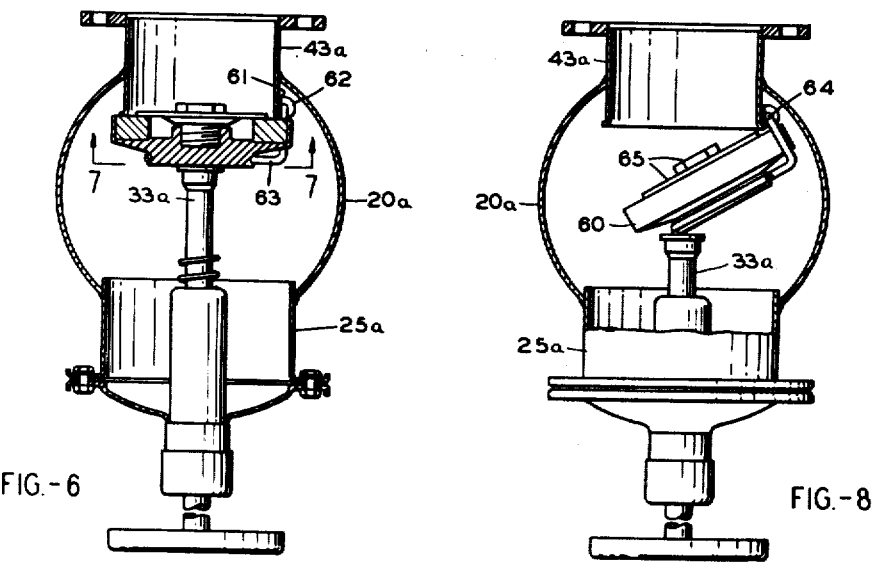
Fig. 6 is a view taken on the line 6—6 of Fig. 5.
Fig. 8 is a view similar to Fig. 6 but showing the valve head in a different operating position.
Figure 7:
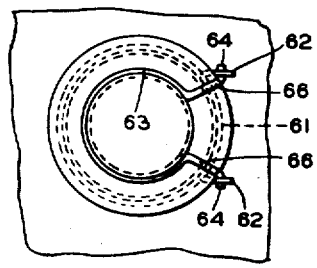
Fig. 7 is a view taken on the line 7—7 of Fig. 6.

The aforesaid dishonest operator may then close the first compartment valve, thereby trapping a substantial volume, and giving short volume from the second compartment. Such occurrence, whether intentional or accidental, is quite impossible with the pivoted valve mounting shown in Figs. 5 to 8 inclusive. The reason is that when the valve of Figs. 6 and 8 is installed and in use the pivotal axis through lugs 62 about which the valve swings extends horizontally and lies above the valve and is offset from the plane of the valve seat toward the manifold. Thus the valve is always biased by gravity toward closed position, so that it serves as a positive check valve preventing return flow through the opening which it controls.

Another advantage to the hinged construction shown is that the valve head can rotate freely within the spring clip holder, thereby equalizing wear, and giving a greatly increased service life.

What I claim is:

Liquid discharge control means for a liquid storage tank, said means comprising a relatively thin walled manifold formed from sheet metal, two opposed wall portions of said manifold being each provided with a respective circular aperture, the axis through the centers of said apertures being located to lie in a horizontal plane when said manifold is in service position beneath said tank, a bottom wall portion of said manifold being below the lowest portion of said circular apertures and being unobstructed when in such service position so as to avoid trapped pools of liquid in said manifold after liquid transmission therethrough, leak proof supporting means for a valve stem in one said aperture, means for admitting liquid to said manifold through the other said aperture including a tube member in communication with said tank, and fittedly carried in said aperture and having an inner portion extending within the manifold wall, the inner end of said tube member being shaped to provide an inlet valve seat of annular contour, a pair of spaced lugs fixed to the outer periphery of said inner end of said tube member, each lug having a bearing aperture therein, a valve head for said inlet valve adapted to be swingably movable into and out of liquid-sealing contact with said valve seat, valve head supporting means comprising a spring clamp surrounding and gripping a major portion of the periphery of said valve head, said spring clamp means having free ends compressible so as to be snapped into and out of retaining insertion in said bearing apertures, said valve head being rotatably retainable in said spring clamp means, said lugs and said spring clamp free ends being located entirely within said manifold and out of contact with the manifold wall, the pivotal axis through said bearing apertures in said lugs being displaced out of the plane of said valve seat whereby to permit gravity bias of said valve head towards said valve seat, the inner end of said valve stem being movable into and out of operating contact with said valve head whereby respectively to urge said valve head to closed position or to permit opening thereof by liquid pressure on the side of said valve head remote from said stem so as to allow liquid to flow from said tube into said manifold when said stem is withdrawn.

JOSEPH H. DE FREES.

REFERENCES CITED

The following references are of record in the file of this patent:

UNITED STATES PATENTS

| Number | Name | Date |
| --- | --- | --- |
| 93,918 | Snyder | Aug. 17, 1869 |
| 725,470 | Moore | Apr. 14, 1903 |
| 883,808 | Kitchen | Apr. 7, 1908 |
| 996,099 | Leidecker | June 27, 1911 |
| 1,125,606 | Tripp | Jan. 19, 1915 |
| 1,163,716 | Van Der Putten | Dec. 14, 1915 |
| 1,198,128 | Hills | Sept. 12, 1916 |
| 1,233,391 | Eckman | July 17, 1917 |
| 1,234,181 | Kinney | July 24, 1917 |
| 1,635,842 | Hirshstein | July 12, 1927 |
| 1,642,242 | Gray | Sept. 13, 1927 |
| 1,658,324 | Bonitz | Feb. 7, 1928 |
| 1,813,273 | Bovey | July 7, 1931 |